United States Patent [19]

Ziller

[11] 4,318,811
[45] Mar. 9, 1982

[54] KETTLE FILTER

[75] Inventor: Josef Ziller, Waldstetten, Fed. Rep. of Germany

[73] Assignee: Schenk-Filterbau Gesellschaft mit beschränkter Haftung, Waldstetten, Fed. Rep. of Germany

[21] Appl. No.: 114,721

[22] Filed: Jan. 23, 1980
(Under 37 CFR 1.47)

[30] Foreign Application Priority Data

Jan. 23, 1979 [DE] Fed. Rep. of Germany ....... 2902444

[51] Int. Cl.³ .............................................. B01D 29/34
[52] U.S. Cl. ..................... 210/232; 210/345
[58] Field of Search ............... 210/232, 237, 236, 234, 210/345, 347

[56] References Cited

U.S. PATENT DOCUMENTS

| | | | |
|---|---|---|---|
| 1,198,282 | 9/1916 | Salisbury | 210/232 |
| 1,794,281 | 2/1931 | Dorfner | 210/237 |
| 2,975,903 | 3/1961 | Ulrich | 210/236 |
| 3,513,090 | 5/1970 | Migure et al. | 210/347 X |
| 3,666,107 | 5/1972 | Boggs | 210/347 X |
| 4,116,838 | 9/1978 | Lazzarotto | 210/346 |

*Primary Examiner*—John Adee
*Attorney, Agent, or Firm*—Becker & Becker, Inc.

[57] ABSTRACT

A boiler or kettle filter, for liquids, with a plurality of disc-like filter elements arranged close to each other in the kettle or boiler. The filter elements are combined into a filter package. A lifting device is arranged in the kettle, and with it the filter package is capable of being lifted over and beyond the kettle or boiler edge by at least the height or level of the respective uppermost filter element.

2 Claims, 1 Drawing Figure

U.S. Patent   Mar. 9, 1982   4,318,811
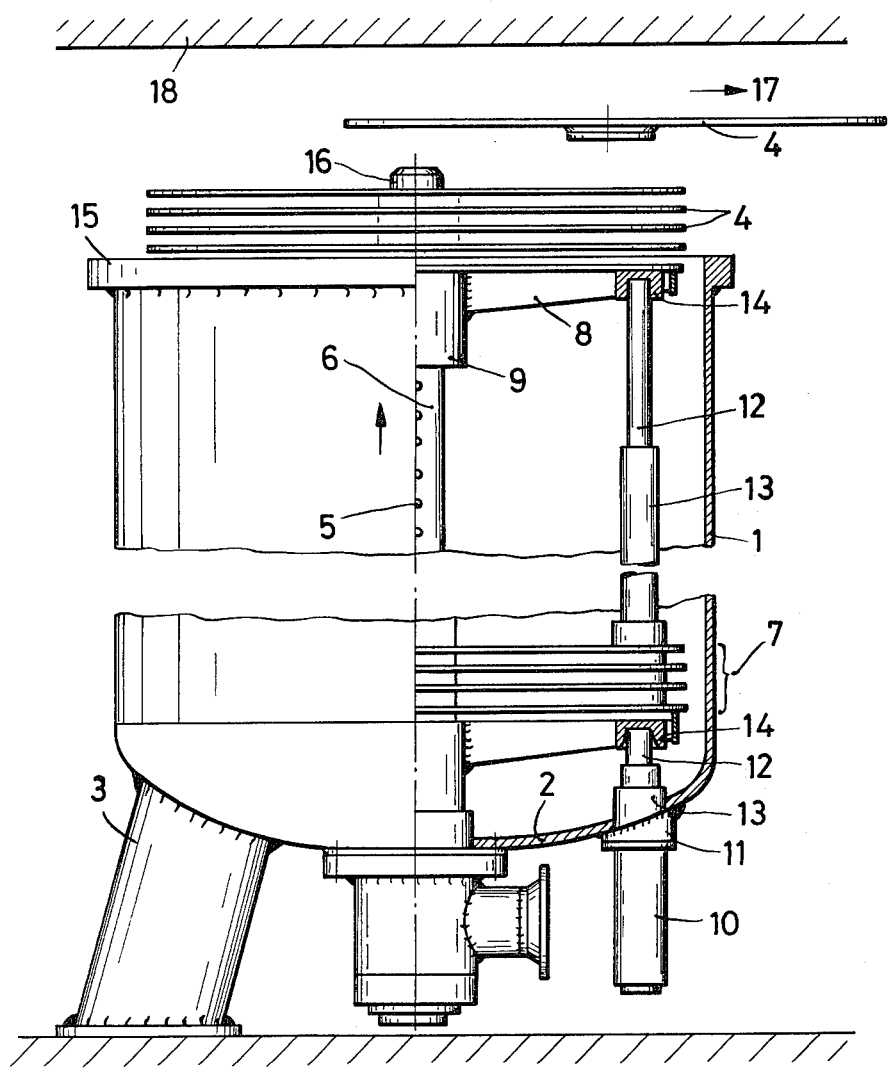

KETTLE FILTER

The present invention relates to a kettle or boiler filter, for liquids with a plurality of disc-like filter elements arranged close to each other in the boiler or kettle. The filter elements are combined into a filter package. As a rule, the filter elements are seated closely over each other upon a vertical filtrate discharge shaft centrally arranged in the kettle. For inspection, the filter elements must be capable of being installed and removed with respect to the filter kettle or boiler.

Previously, the installation and removal of the filter elements, with standing boiler or kettle filters, occurred in such a manner that the filtrate discharge shaft, together with the built-up or stacked filter elements, was withdrawn by means of a lift upwardly over the kettle flange, and was subsequently lowered as a closed unit onto the floor or ground next to the filter kettle, and was removed or taken out of action. Subsequently, the filter elements are individually removed or lifted from the filtrate discharge shaft. The installation of the filter elements into the filter kettle occurs in opposite sequence.

The installation and removal described above is accompanied by the disadvantage that above the kettle flange an open height or clearance is necessary as far as to the ceiling of the room or chamber in which the kettle filter is operated, and such open height corresponds at least to the height of the filter package.

It is also already known, instead of the entire filter package, to lift the filter elements individually from the kettle one after another by hand or with a lifting device, for example by way of lift rods, upwardly over the filtrate discharge shaft and beyond the upper kettle flange. The filter elements are subsequently put out of action on the floor or ground next to the kettle filter. The installation occurs in opposite sequence, whereby the filter elements are lifted from the bottom or ground as far as to over the upper end of the filtrate discharge shaft, and are then lowered into the kettle interior. With this method for installation and removal of the filter elements, only a small open height to the ceiling is required when compared with the previously described situation of lifting the filter package in its entirety. The installation and removal of the individual filter elements one after another or sequentially from the filter kettle, however, represents a difficult bodily exertion or strain and requires a lot of time. Additionally, there exists the danger that the filter package in itself is not properly sealed off again during the reinstallation, because it is practically impossible during placement of the individual filter elements one upon another within the filter kettle to carry out a sufficient visual control to preclude that during installation a seal tilts or is displaced, or is entirely forgotten or is not placed in the correct sequence.

It is an object of the present invention to facilitate the installation and removal of filter elements and to create the possibility to be able to set up and operate kettle or boiler filters having relatively high structural heights in chambers or rooms having a low open height.

This object, and other objects and advantages of the present invention, will appear more clearly from the following specification in connection with the accompanying drawing, which is a view partially sectioned along the vertical axis of a kettle or boiler filter having features in accordance with the present invention.

The kettle filter of the present invention is characterized primarily in that in the kettle there is arranged a lifting device with which the filter package is successively liftable over the kettle edge and beyond by at least the height of the respective uppermost filter element. This is accompanied by the advantage that the uppermost filter element, which is respectively lifted over the kettle or boiler edge is completely free at the top and can be lifted or taken off without hindrance by a lifting device or the like, and without bodily force application or energy consumption.

With a preferred embodiment, the boiler or kettle has a bottom having a load-bearing capacity or capacity for resistance relative to mechanical load forces, and this bottom can be curved in a spherical manner as a so-called clapper bottom (Klöpperboden), in which at least one, preferably three, hydraulically or pneumatically actuable, telescopic cylinders are fastened which, during their upwardly directed lift movement, engage against the underside of the filter package.

Such hydraulic or pneumatic lifting devices provide the possibility that the lifting or lowering speed can be changed in a stepless or continuous manner, and that the lifting device can be brought to a standstill at liberty.

By the inventive arrangement of a lifting device within the filter housing kettle or boiler, the partially quite heavy filter elements can be lifted or pressed upwardly from below without having to introduce lifting tools from the outside. This has the advantage that still only a small open height above the kettle filter is required. Mostly, the normal room heights are sufficient to be able to set up a kettle filter having a large filter height. Previously, it was frequently necessary to make available a suitable room or chamber for the kettle filter.

Referring now to the drawing in detail, the illustrated kettle or boiler filter has a filter housing vessel, boiler or kettle 1 which is welded pressure-tight and has a cylindrical kettle wall and a drum-shaped, barrel-shaped or cylindrical, ellipsoidal bottom 2, a so-called clapper bottom, on which three slightly inclined, column-like feet are welded into place, only one foot 3 of which is shown in the drawing.

With filters for liquids, for example whey, there are provided within the filter housing kettle or boiler 1 approximately thirty to a hundred filter elements 4 which are stacked or layered one above the other and are set up in a row or series tightly one above the other upon a filtrate discharge shaft 6 provided with drainage or discharge bores 5. The so-formed filter stack 7 is supported or carried by a traverse or bar 9 which is provided with three radially projecting arms 8 and is guided upon the filtrate drainage shaft 6 in a manner so as to be shiftable or variable in height.

So that the filter elements 4 can be removed from the kettle 1 for inspection and servicing, one of the three lifting devices 10 is respectively arranged between the column-type feet 3. Each of these lifting devices is embodied as a telescopic cylinder which is fastened or secured in an eyelet-shaped extension 11 on the bottom 2 in such a way that the telescopic pipes 12 and 13 thereof can be extended or driven out upwardly parallel to the axis of the centrally arranged filtrate discharge shaft 6 under the influence of a hydraulic or pneumatic pressure medium. In so doing, the telescopic pipe 12, which is embodied as a piston rod, in a manner clearly recognizable from the lower section of the drawing, engages into a cup-shaped receiver or receptacle 14 near the outer edge of the traverse 9 and lifts the traverse, including the filter package 7 supported thereon, to such an extent, with an adjustable speed, that the filter element 4 located at the top is pushed over the kettle edge 15 and the upper end segment 16 of the filtrate discharge shaft 6, which is rigidly fixed in the kettle 1. The filter element 4 is then exposed to such an extent that it can be removed laterally in a manner indicated by the arrow 17. By means of the inventive arrangement of the lifting device 10, only a low, open or clear intermediate space is necessary relative to the ceiling 18 of the room where the kettle filter is operated. The lateral removal consequently can be readily effected with a non-illustrated ceiling crane pivotable or movable below the ceiling.

The actuation of the telescopic cylinder of lifting device 10 occurs by a non-illustrated pump unit, which also assures the synchronization of the three piston rods 12 or telescopic pipes 13. The stroke is controllable in a stepless manner.

For reinstallation of the filter elements 4, these are only placed from above onto the traverse 9, which, in place of the support or carrier arms 8, can have a continuous support ring, whereby the advantage exists that by way of the visual control capable of being carried out at eye level, the placement of the individual filter elements is assured such that the non-illustrated seals which are to be placed between the individual elements can be situated in an orderly manner and inserted in the correct sequence.

The special advantages of the inventive arrangement of the lifting devices 10 consist of the following:

(a) Only a very small room height is necessary; for example, a kettle filter produced in a known embodiment can be set up and operated with 120 m² filter surface in a room of only 4.10 m height;

(b) only a small requirement for personnel and nominal bodily force application or energy consumption are necessary;

(c) a gentle handling of the filter elements is assured; and (d) installation errors can be extensively avoided, since an exact or accurate seating of the filter elements and, above all, the seals can be controlled at eye level.

The present invention is, of course, in no way restricted to the specific disclosure of the specification and drawing, but also encompasses any modifications within the scope of the appended claims.

What I claim is:

1. A kettle filter for liquids, the kettle filter comprising:

a housing having a closed bottom and an upper edge defining an opening for closure by a cover during operation of the filter;

a hollow vertical support projecting from the bottom of the housing and beyond the upper edge thereof, said hollow support including openings into which filtrate is discharged and a discharge valve beneath the bottom of the kettle;

a plurality of filter discs stacked in sliding relationship on said hollow support for forming a filter package;

jack means positioned beneath the lowest filter element between the bottom of the kettle and the lowest filter element, the jack means including telescoped segments which extend when the jack means is pressurized, and means for pressurizing the jack means to lift the entire filter package so that the uppermost filter elements can be sequentially unstacked from the support as the package is raised, whereby the ceiling height of the room containing the kettle need not be raised to accommodate removal of the filter package.

2. A kettle filter according to claim 1 wherein the jack means comprises a plurality of jacks each including telescoped segments which are fluid actuated by the energizing means.

* * * * *

UNITED STATES PATENT AND TRADEMARK OFFICE
CERTIFICATE OF CORRECTION

PATENT NO. : 4,318,811
DATED : March 9, 1982
INVENTOR(S) : Josef Ziller

It is certified that error appears in the above—identified patent and that said Letters Patent is hereby corrected as shown below:

On the Title Page: in Item (22), please eliminate

"(Under 37 CFR 1.47)" .

Signed and Sealed this

Fourth Day of May 1982

[SEAL]

Attest:

GERALD J. MOSSINGHOFF

Attesting Officer

Commissioner of Patents and Trademarks